US011669634B2

(12) United States Patent
Chen

(10) Patent No.: US 11,669,634 B2
(45) Date of Patent: Jun. 6, 2023

(54) PRIVACY-PRESERVING PREDICTING METHOD AND ELECTRICAL DEVICE

(71) Applicant: NATIONAL SUN YAT-SEN UNIVERSITY, Kaohsiung (TW)

(72) Inventor: Bo-Wei Chen, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 512 days.

(21) Appl. No.: 16/817,583

(22) Filed: Mar. 12, 2020

(65) Prior Publication Data
US 2021/0141927 A1    May 13, 2021

(30) Foreign Application Priority Data

Nov. 12, 2019  (TW) .................. 108141046

(51) Int. Cl.
*G06F 21/62* (2013.01)
*G06N 5/04* (2023.01)
*G06N 20/00* (2019.01)

(52) U.S. Cl.
CPC .......... *G06F 21/6245* (2013.01); *G06N 5/04* (2013.01); *G06N 20/00* (2019.01)

(58) Field of Classification Search
None
See application file for complete search history.

(56) References Cited

U.S. PATENT DOCUMENTS 9,704,102 B2    7/2017  Baraniuk et al.
2001/0014868 A1*  8/2001  Herz .................. G06Q 30/0269
                                                     705/26.1
(Continued)

FOREIGN PATENT DOCUMENTS

CN    101911620 A    12/2010
CN    208092228 U    11/2018
(Continued)

OTHER PUBLICATIONS

Abdi; "Partial least squares regression and projection on latent structure regression (PLS Regression)"; 2010; retrieved from the Internet https://personal.utdallas.edu/~herve/abdi-wireCS-PLS2010.pdf; pp. 1-10, as printed. (Year: 2010).*

(Continued)

*Primary Examiner* — Michael W Chao
(74) *Attorney, Agent, or Firm* — CKC & Partners Co., LLC

(57) ABSTRACT

A provided method includes: obtaining a predictor matrix having at least one masked attribute; obtaining a response matrix; setting that the predictor matrix is approximated by a product of a basis matrix and a coefficient matrix; setting that the response matrix is approximated by a product of a weight matrix, a projection matrix and the predictor matrix; setting that the basis matrix, the coefficient matrix, the weight matrix, and the projection matrix are nonnegative; setting that the projection matrix, the weight matrix, or a product of the projection matrix and the predictor matrix is orthogonal, and thus setting a cost function; and calculating the basis matrix, the coefficient matrix, the weight matrix, and the projection matrix according to the cost function. Accordingly, operations of imputation, fitting, and subspace analysis can be performed.

4 Claims, 3 Drawing Sheets

(56) References Cited

U.S. PATENT DOCUMENTS

| | | | | |
|---|---|---|---|---|
| 2002/0107858 | A1* | 8/2002 | Lundahl | G06F 18/23 |
| 2012/0036037 | A1* | 2/2012 | Xiao | G06Q 30/00 |
| | | | | 705/26.7 |
| 2013/0102372 | A1 | 4/2013 | Lutnick et al. | |
| 2016/0063546 | A1* | 3/2016 | Ghosh | G06Q 30/0255 |
| | | | | 705/14.53 |
| 2016/0283738 | A1* | 9/2016 | Wang | G06N 20/00 |
| 2017/0293857 | A1* | 10/2017 | Stajner | G01C 21/3617 |
| 2020/0242466 | A1* | 7/2020 | Mohassel | H04L 9/085 |

FOREIGN PATENT DOCUMENTS

| | | |
|---|---|---|
| TW | 200734200 A | 9/2007 |
| TW | I461933 B | 11/2014 |

OTHER PUBLICATIONS

Pang-Ming Chu, "Leveraging User Comments for Collaborative Filtering Recommendation in E-Commerce," Master Thesis, Department of Electronic Engineering National Sun Yat-Sen University, Taiwan, R.O.C., Jul. 2018.

X. Ma et al., "Lossless ROI privacy protection of H.264/AVC compressed surveillance videos," IEEE Transactions on Emerging Topics in Computing, vol. 4, No. 3, pp. 349-362, Sep. 2016.

R. Parameswaran, "A robust data obfuscation approach for privacy preserving collaborative filtering," Ph.D. dissertation, School of Electrical and Computer Engineering, Georgia Institute of Technology, Atlanta, Georgia, United States, Aug. 2006.

S. Z. Li et al., "Learning spatially localized, parts-based representation," in Proceedings of the 2001 IEEE Conference on Computer Vision and Pattern Recognition, Kauai, Hawaii, United States, Dec. 8-14, 2001, 6 pages.

A. Paterek, "Improving regularized singular value decomposition for collaborative filtering," in Proc. 13th ACM SIGKDD International Conference on Knowledge Discovery and Data Mining (KDD 2007), San Jose, California, United States, 2007, Aug. 12-15, pp. 39-42.

Y. Zhou et al., "Large-scale parallel collaborative filtering for the Netflix prize," in Proc. 4th International Conference on Algorithmic Applications in Management, Shanghai, China, Jun. 23-25, 2008, pp. 337-348.

C. Hsu et al., "A general framework for implicit and explicit social recommendation," IEEE Transactions on Knowledge and Data Engineering, vol. 30, No. 12, pp. 2228-2241, Dec. 2018.

X. Kong et al., "Time-Location-relationship combined service recommendation based on taxi trajectory data," IEEE Transactions on Industrial Informatics, vol. 13, No. 3, pp. 1202-1212, Jun. 2017.

S. Dray et al., "Principal component analysis with missing values: A comparative survey of methods," Plant Ecology (2015)216:657-667.

H. Abdi, "Partial least squares regression and projection on latent structure regression (PLS Regression)," Wiley Interdisciplinary Reviews: Computational Statistics, vol. 2, No. 1, pp. 97-106, Jan. 2010.

R. Rosipal et al., "Overview and recent advances in partial least squares," in Proc. 2005 International Conference on Subspace, Latent Structure and Feature Selection, Bohinj, Slovenia, Feb. 23-25, 2005, pp. 34-51.

H. Abdi et al., "Partial least squares methods: Partial least squares correlation and partial least square regression," in Computational Toxicology: vol. II, vol. 930, B. Reisfeld and A. N. Mayeno, Eds. Totowa, NJ: Humana Press, 2013, pp. 549-579.

G. Li et al., "Quality relevant data-driven modeling and monitoring of multivariate dynamic processes: The dynamic T-PLS approach," IEEE Transactions on Neural Networks, vol. 22, No. 12, pp. 2262-2271, Dec. 2011.

S. Roweis, "EM algorithms for PCA and SPCA," in Proc. 10th Annual Conference on Neural Information Processing Systems (NIPS), Denver, Colorado, United States, Dec. 2-4, 1997, pp. 626-632.

S. Muñoz-Romero et al., "Nonnegative OPLS for supervised design of filter banks: Application to image and audio feature extraction," IEEE Transactions on Multimedia, vol. 20, No. 7, pp. 1751-1766, Jul. 2018.

S. Choi, "Algorithms for orthogonal nonnegative matrix factorization," in Proc. 2008 IEEE International Joint Conference on Neural Networks, Hong Kong, China, Jun. 1-8, 2008, pp. 1828-1832.

C. Ding et al., "Orthogonal nonnegative matrix tri-factorizations for clustering," in Proc. 12th ACM SIGKDD International Conference on Knowledge Discovery and Data Mining (KDD 2006), Philadelphia, Pennsylvania, United States, Aug. 20-23, 2006, pp. 126-135.

K. A. Severson et al., "Principal component analysis of process datasets with missing values," Processes 2017, 5, 38, Jul. 2017.

* cited by examiner

300

| user number | 1 | 2 | ... | N |
|---|---|---|---|---|
| age | ■ | | | |
| gender | | ■ | | |
| place of residence | | ■ | | ■ |
| ... | | | | |
| browsing time of web page 1 | ■ | | | |
| browsing time of web page 2 | ■ | | | |
| purchase history of product 1 | | | | ■ |
| purchase history of product 2 | | | | ■ |
| purchase history of product 3 | | | | ■ |

FIG. 3

PRIVACY-PRESERVING PREDICTING METHOD AND ELECTRICAL DEVICE

RELATED APPLICATIONS

This application claims priority to Taiwan Application Serial Number 108141046 filed Nov. 12, 2019, which is herein incorporated by reference.

BACKGROUND

Field of Invention

The present invention relates to a privacy-preserving predicting method for performing operations of imputation, fitting, and sub-space analysis simultaneously.

DESCRIPTION OF RELATED ART

For privacy protection clauses, such as the General Data Protection Regulation (GDPR) proposed by the European Union, the privacy protection mechanism on software can be divided into three categories depending on the strength: encryption, obfuscation and information removal. Information removal technology uses masks to directly remove sensitive data from the original data that is irreversible and therefore is usually used for highly confidential data. Using information removal will loss numerical values, and therefore mathematical calculations such as general data mining algorithms cannot be performed. In this case, it is necessary to perform masked-value imputation first for subsequent analysis such as fitting and subspace analysis. The conventional techniques cannot simultaneously perform the three operations of imputation, fitting, and subspace analysis.

SUMMARY

Embodiments of the present disclosure provide a privacy-preserving predicting method for an electric device. The privacy-preserving predicting method including: obtaining a predictor matrix including multiple prediction records, in which each of the prediction records includes multiple prediction attributes, and at least one of the prediction attributes is masked; obtaining a response matrix including multiple response records, in which each of the response records includes multiple response attributes; setting that the predictor matrix is approximately equal to a product of a basis matrix and a coefficient matrix, setting that the response matrix is approximately equal to a product of a weight matrix, a projection matrix, and the predictor matrix with all of the basis matrix, the coefficient matrix, the weight matrix and the projection matrix equal to nonnegative matrices, and setting that the projection matrix, the weight matrix or a product of the projection matrix and the predictor matrix is orthogonal so as to determine a cost function; estimating the basis matrix, the coefficient matrix, the weight matrix and the projection matrix according to the cost function; obtaining a new vector including multiple attributes, in which the number of the attributes is equal to the number of the prediction attributes of each of the prediction records; and merging the new vector with the predictor matrix to obtain a new predictor matrix, and calculating a product of the new predictor matrix, the weight matrix and the projection matrix to obtain values of the response attributes corresponding to the new vector.

In some embodiments, at least one of the attributes of the new vector is masked.

In some embodiments, the prediction records correspond to multiple users respectively, and the prediction attributes include age, genders, places of residence, web browsing time and purchase histories of the users.

In some embodiments, the response records correspond to the users respectively, and the response attributes include advertising browsing time.

In some embodiments, the privacy-preserving predicting method further includes: estimating a product of the basis matrix and the coefficient matrix to obtain a masked prediction attribute of the prediction attributes.

From another aspect, an electric device including a memory and a processor is provided. The memory stores multiple instructions which are executed by the processor to perform the privacy-preserving predicting method.

In the predicting method, operations of imputation, fitting, and subspace analysis can be accomplished simultaneously.

BRIEF DESCRIPTION OF THE DRAWINGS

The invention can be more fully understood by reading the following detailed description of the embodiment, with reference made to the accompanying drawings as follows.

FIG. 3 is a diagram illustrating a table for a predictor matrix in accordance with an embodiment.

DETAILED DESCRIPTION

Specific embodiments of the present invention are further described in detail below with reference to the accompanying drawings; however, the embodiments described are not intended to limit the present invention, and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual sizes.

Figure 1:
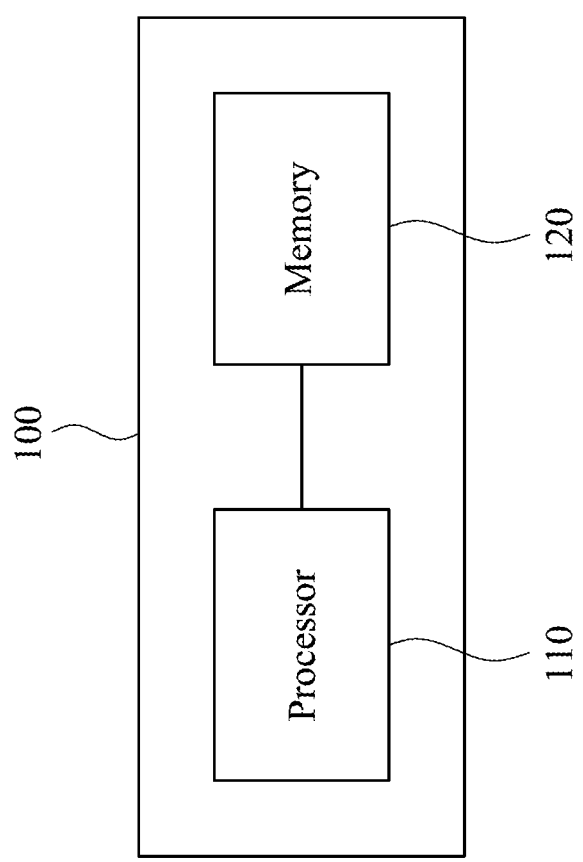
FIG. 1 is a schematic diagram illustrating an electric device in accordance with an embodiment.

FIG. 1 is a schematic diagram illustrating an electric device in accordance with an embodiment. Referring to FIG. 1, an electric device 100 may be a smart phone, a tablet, a personal computer, a notebook computer, a server, an industrial computer, or any electric device having computing ability, which is not limited in the invention. The electric device 100 includes a processor 110 and a memory 120. The processor 110 may be a central processing unit, a microprocessor, a microcontroller, etc. The memory 120 may be a volatile memory or a non-volatile memory storing instructions that are executed by the processor to perform a privacy-preserving predicting method.

The provided method can perform operations of imputation, fitting, and subspace analysis at the same time. Fitting is to predict a response matrix according to a predictor matrix. Take advertising push as an example, the predictor matrix is shown as a table 300 illustrated in FIG. 3 including N+1 columns and M+1 rows where M and N are positive integers. The first row indicates user numbers, and the first column indicates types of attributes of the predictor matrix. The values in the second to $(N+1)^{th}$ columns and in the second to $(M+1)^{th}$ rows constitute the predictor matrix. The second to $(N+1)^{th}$ columns refer to prediction records corresponding to N users. Each of the prediction records includes M prediction attributes such as age, genders, places of residence, web browsing time, and purchase histories. The black square in the table 300 indicates that the prediction attribute has been masked while unmasked attributes can be filled in with arbitrary values which are not limited in the invention.

The aforementioned response matrix is shown in the following Table 1 which includes N+1 columns and L+1 rows where L is a positive integer. The first row indicates the user numbers, and the first column indicates types of attributes of the response matrix. The values in the second to $(N+1)^{th}$ columns and second to $(L+1)^{th}$ rows constitute the response matrix. The second to $(N+1)^{th}$ columns refer to response records corresponding to the N users. Each of the response records includes L response attributes such as browsing time of advertisements. Note that no response attribute is masked in Table 1.

TABLE 1

| user number | 1 | 2 | ... | N |
|---|---|---|---|---|
| browsing time of advertisement 1 | | | | |
| browsing time of advertisement 2 | | | | |
| ... | | | | |
| browsing time of advertisement L | | | | |

Table 300 of FIG. 3 records the users' web browsing histories and product purchase histories that are used to fit (i.e. predict) the users' browsing time of advertisements in Table 1. This fitting process can also be referred to as a training phase. In a test phase, the training result is used to predict preferences of new users in order to push relative advertisements. The detailed predicting method will be explained in more detail below. Note that the table 300 and Table 1 are merely examples. In other embodiments, the predictor matrix and the response matrix may be related to other services or products such as tool machines or on-line learning. For example, each prediction record of the predictor matrix may be related to a product, the prediction attributes may include some manufacturing parameters, and the response attributes of the response matrix are specifications and/or yields of the product. The sizes and content of the predictor matrix and the response matrix are not limited in the invention.

In the following equations, the predictor matrix is written as X, of which the size is M×N. The response matrix is written as Y, of which the size is L×N. Note that the matrix or vector is written in bold here, and non-bold symbols represent scalars. At least one prediction attribute in the predictor matrix X is masked that is initially filled in zeros. In the embodiment, it is set that the predictor matrix is approximately equal to a product of a basis matrix and a coefficient matrix that is written as X≈AB where A is the basis matrix with size of M×K, and B is the coefficient matrix with size of K×N. The basis matrix A and the coefficient matrix B are nonnegative matrices, and that is to say, all the included values are nonnegative. In addition, it is set that the response matrix is approximately equal to a product of a weight matrix, a projection matrix and the predictor matrix that is written as $WU^TX \approx Y$ where W is the weight matrix with size of L×D, U is the projection matrix with size of M×D, and D is a positive integer. The weight matrix W and the projection matrix U are both nonnegative matrices.

Three orthogonal conditions are set herein: (1) the projection matrix U is orthogonal; (2) the weight matrix W is orthogonal; and (3) the product of the projection matrix W and the predictor matrix X is orthogonal. These three conditions are used to set three different cost functions respectively, and the values in the basis matrix A, the coefficient matrix B, the weight matrix W and the projection matrix U can be estimated according to the corresponding cost function. Three embodiments are provided with respect to the three conditions.

First Embodiment

In the first embodiment, the projection matrix U is orthogonal, and the following equation (1) is set as the cost function based on the aforementioned description of the predictor matrix X and the response matrix Y.

$$E = \|Y-WU^TAB\|_F^2 + \rho_X\|X-AB\|_F^2 + \rho_A\|A\|_F^2 + \rho_B\|B\|_F^2 + \rho_W\|W\|_F^2 + \rho_U\|U\|_F^2 + Tr\{\alpha(U^TU-I)\} \quad (1)$$

$Tr(\cdot)$ is the trace operator for calculating the trace of a matrix. The superscript T represents the transpose of the matrix. $\|\cdot\|_F^2$ is the square of the Frobenius norm of the matrix. $\alpha$ is a symmetric Lagrangian multiplier matrix with size of D×D. In other words, identical Lagrangian multipliers are filled in the symmetric positions of the matrix $\alpha$. I is an identity matrix. $\rho_X$, $\rho_A$, $\rho_B$, $\rho_W$ and $\rho_U$ are real numbers which can be determined by experiments. The first term of the equation (1) is to approximate the response matrix Y by the product of the weight matrix W, the projection matrix U and the predictor matrix X. The second term of the equation (1) is to approximate the predictor matrix X by the product of the basis matrix A and the coefficient matrix B. The third to sixth terms of the equation (1) are to prevent the basis matrix A, the coefficient matrix B, the weight matrix W and the projection matrix U from being too complex (i.e. avoid overfitting). The last term is used to impose orthogonal constraints on the projection matrix U.

Note that a few nonnegativity constraints have to be added into the equation (1). That is, the values in the basis matrix A, the coefficient matrix B, the weight matrix W and the projection matrix U are limited to be nonnegative. After the cost function and the constraints are set, any suitable searching algorithm such as genetic algorithms and particle swarm optimization algorithms can be used to estimate the values of the basis matrix A, the coefficient matrix B, the weight matrix W and the projection matrix U such that the value E of the equation (1) is minimized. In some embodiments, the function (1) is a convex function with respect to a variable when other variables are fixed, and therefore it can be solved by differentiation. To be specific, differentiating E of the equation (1) with respect to the element of matrices $A_{m,k}$, $B_{k,n}$, $W_{l,d}$ and $U_{m,d}$ yields the following equations (2)-(5) respectively.

$$\frac{\partial E}{\partial A_{m,k}} = \quad (2)$$
$$2(-UW^TYB^T + UW^TWU^TABB^T - \rho_X XB^T + \rho_X ABB^T + \rho_A A)_{m,k}.$$

$$\frac{\partial E}{\partial B_{k,n}} = \quad (3)$$
$$2(-A^TUW^TY + A^TUW^TWU^TAB - \rho_X A^TX + \rho_X A^TAB + \rho_B B)_{k,n}.$$

$$\frac{\partial E}{\partial W_{l,d}} = 2(-YB^TA^TU + WU^TABB^TA^TU + \rho_W W)_{l,d}. \quad (4)$$

$$\frac{\partial E}{\partial U_{m,d}} = 2(-ABY^TW + ABB^TA^TUW^TW + \rho_U U + \alpha U)_{m,d}. \quad (5)$$

In this way, Lagrangian multiplier matrices are not included in the equations (2)-(4), so their multiplicative rule can be easily derived. The multiplicative rule means that the values of the matrix can be updated by multiplying the basis matrix A, the coefficient matrix B, the weight matrix W or the projection matrix U by a multiplier. A Lagrangian multiplier matrix is still included in the equation (5). To derive the multiplicative rule of U without solving the Lagrangian multiplier matrix, Stiefel manifold gradients are adopted. Let $\nabla \tilde{g}_{U_{md}}$ denote Stiefel manifold gradient of the matrix U. It follows that $\nabla \tilde{g}_{U_{md}} = \nabla g_{U_{md}}^{+} - \nabla g_{U_{md}}^{-}$, where $\nabla g_{U_{md}}^{+}$ and $\nabla g_{U_{md}}^{-}$ are calculated according to the following equations (6) and (7).

$$\nabla g_{U_{md}}^{-} = 2ABY^T W + 2UW^T WU^T ABB^T A^T U \quad (6)$$

$$\nabla g_{U_{md}}^{+} = 2ABB^T A^T UW^T W + 2UW^T YB^T A^T U \quad (7)$$

Besides, $\nabla g_{U_{md}}^{-} > 0$ and $\nabla g_{U_{md}}^{+} > 0$. The multiplicative rule of the matrix U is written in the following equation (8) by forming $\nabla g_{U_{md}}^{-} / \nabla g_{U_{md}}^{+}$.

$$U_{md} \leftarrow \max\left(\epsilon, U_{md} \odot \frac{(ABY^\top W + UW^\top WU^\top ABB^\top A^\top U)_{md}}{(ABB^\top A^\top UW^\top W + UW^\top YB^\top A^\top U)_{md}}\right) \quad (8)$$

⊙ represents element-wise multiplication. The division in the equation (8) is also element-wise division. max(·) is used to calculate the maximum, and ϵ is a small positive value. In addition, m and d are indexes for indicating the element in the $m^{th}$ row and $d^{th}$ column where $1 \leq m \leq M$, $1 \leq d \leq D$. In the initial step, the values of the matrix U are determined randomly, and the values are updated by the equation (8). Moreover, the values of the matrix U are nonnegative.

On the other hands, the multiplicative rules of the matrices A, B and W are written in the following equations (9)-(11).

$$A_{mk} \leftarrow \left(\epsilon, A_{mk} \odot \frac{(UW^\top YB^\top + \rho_X XB^\top)_{mk}}{(UW^\top WU^\top ABB^\top + \rho_X ABB^\top + \rho_A A)_{mk}}\right) \quad (9)$$

$$B_{kn} \leftarrow \left(\epsilon, B_{kn} \odot \frac{(A^\top UW^\top Y + \rho_X A^\top X)_{kn}}{(A^\top UW^\top WU^\top AB + \rho_X A^\top AB + \rho_B B)_{kn}}\right) \quad (10)$$

$$W_{ld} \leftarrow \left(\epsilon, W_{ld} \odot \frac{(YB^\top A^\top U)_{ld}}{(W(U^\top ABB^\top A^\top U + \rho_W I))_{ld}}\right) \quad (11)$$

In the equations, I, k, and n are indexes where $1 \leq n \leq N$, $1 \leq l \leq L$, and $1 \leq k \leq K$. Similarly, the values of the matrices A, B and W are set randomly in the initial step, and then they are updated by the equations (9)-(11). Performing equations (8)-(11) is referred to one round, and the matrices A, B, U and W converge after several rounds are performed. In some embodiments, if the magnitude of changes in the matrices A, B, U, and W converges within a preset range, or when the number of rounds exceeds a preset number, the updating procedure stops. Note that the masked attributes of X can be derived and updated by the corresponding elements in AB in each round.

Second Embodiment

In the second embodiment, the projection matrix W is orthogonal, and the following equation (12) is set as the cost function based on the aforementioned description of the predictor matrix X and the response matrix Y.

$$E = \|Y - WU^T AB\|_F^2 + \rho_X \|X - AB\|_F^2 + \rho_A \|A\|_F^2 + \rho_B \|B\|_F^2 + \rho_W \|W\|_F^2 + \rho_U \|U\|_F^2 + Tr\{\beta(W^T W - I)\} \quad (12)$$

β is a symmetric Largrangian multiplier matrix with size of D×D. The description of identical symbols will not be repeated herein. The last term of the equation (12) is to impose orthogonality on the matrix W, that is, $W^T W = I$. Similar to the first embodiment, to derive the multiplicative rule of the matrix W without solving the Lagrangian multiplier matrix β, Stiefel Manifold gradients are adopted in the embodiment. Let $\nabla \tilde{g}_{W_{ld}}$ denote the Stiefel manifold gradient of the matrix W, then $\nabla \tilde{g}_{W_{ld}} = \nabla g_{W_{ld}}^{+} - \nabla g_{W_{ld}}^{-}$ where $\nabla g_{W_{ld}}^{-}$ and $\nabla g_{W_{ld}}^{+}$ are calculated according to the following equations (13) and (14).

$$\nabla g_{W_{ld}}^{-} = 2YB^T A^T U \quad (13)$$

$$\nabla g_{W_{ld}}^{+} = 2WU^T ABY^T W \quad (14)$$

Besides, $\nabla g_{W_{ld}}^{-} > 0$ and $\nabla g_{W_{ld}}^{+} > 0$. Based on $\nabla g_{W_{ld}}^{-}/\nabla g_{W_{ld}}^{+}$, the multiplicative rule of the matrix W is written in the following equation (15).

$$W_{ld} \leftarrow \max\left(\epsilon, W_{ld} \odot \frac{(YB^\top A^\top U)_{ld}}{(WU^\top ABY^\top W)_{ld}}\right) \quad (15)$$

The multiplicative rule of the matrix U is derived as the following equation (16) based on $\partial E/\partial U_{md}$.

$$U_{md} \leftarrow \max\left(\epsilon, U_{md} \odot \frac{(ABY^\top W)_{md}}{(ABB^\top A^\top UW^\top W + \rho_U U)_{md}}\right) \quad (16)$$

The multiplicative rules of the matrices A and B are identical to that of the first embodiment. Performing equations (9), (10), (15), and (16) is referred to one round. The matrices A, B, U, and W converge after multiple rounds are performed. The masked attributes of X can be derived and updated by the corresponding elements in AB in each round.

Third Embodiment

In the third embodiment, UX is orthogonal. That is, $U^T \Sigma_{XX} U$ is orthogonal where $\Sigma_{XX} = XX^T$. The following equation (17) is set as the cost function based on this condition and the aforementioned description of the predictor matrix X and the response matrix Y.

$$E = \|Y - WU^T AB\|_F^2 + \rho_X \|X - AB\|_F^2 + \rho_A \|A\|_F^2 + \rho_B \|B\|_F^2 + \rho_W \|W\|_F^2 + \rho_U \|U\|_F^2 + Tr\{\gamma(U^T \Sigma XX U - 1)\} \quad (17)$$

γ is a symmetric Largrangian multiplier matrix with size of D×D. The description of identical symbols will not be repeated herein. The last term of the equation (17) is to impose orthogonal on the matrix $U^T \Sigma_{XX} U$, and that is, $U^T \Sigma_{XX} U = I$. Differentiating the value E of the equation (17) with respect to the element of matrix $U_{md}$ yields the following equation (18). The multiplicative rule of the matrix U is written in the following equation (19).

$$\frac{\partial E}{\partial U_{md}} = 2(-ABY^\top W + ABB^\top A^\top UW^\top W + \rho_U U + \gamma ABB^\top A^\top U)_{md}. \quad (18)$$

$$U_{md} \leftarrow \max\left(\epsilon, U_{md} \odot \frac{(ABY^\top W)_{md}}{(ABB^\top A^\top UW^\top W + ABB^\top A^\top U\gamma + \rho_U U)_{md}}\right) \quad (19)$$

However, the Largrangian multiplier matrix γ is still unknown and need to be solved. In view of such a problem, the multiplicative rule based on orthogonal nonnegative matrix tri-factorizations and Karush-Kuhn-Tucker condition is used to avoid complex computation. In other words, by setting the denominator equal to the nominator in the equation (19), the Largrangian multiplier matrix $\gamma$ then becomes the following equation (20).

$$\gamma = U^T A B Y^T W - W^T W - \rho_U U^T U \qquad (20)$$

The multiplicative rule of the matrix U is written in the following equation (21) by substituting the equation (20) into the equation (19).

$$U_{md} \leftarrow \max\left(\epsilon, U_{md} \odot \sqrt{\frac{(ABY^T W)_{md}}{(ABB^T A^T U U^T (ABY^T W - p_U U) + p_U U)_{md}}}\right) \qquad (21)$$

The multiplicative rules of the matrices A, B, and W are identical to that of the first embodiment. Performing the equations (9)-(11) and (21) is referred to as one round. The matrices A, B, U, and W converge after multiple rounds are performed. The masked attributes of X can be derived and updated by the corresponding elements in AB in each round.

[Imputation, Fitting, and Sub-Space Analysis]

Imputation is described first. As mentioned above, at least one prediction attribute of the predictor matrix X is masked. However, the predictor matrix X is approximately equal to the product of the basis matrix A and the coefficient matrix B in the embodiments, and therefore the masked attributes can be estimated according to the corresponding element of the product AB. In addition, the imputation error and fitting error are considered simultaneously while the imputation is performed so as to calculate the orthogonal subspace projection transformation matrix, and thus the independent variables (i.e. the predictor matrix X) are transformed into an independent variable subspace with less noises that is suitable for fitting dependent variables (i.e. the response matrix Y).

The fitting is described herein. The predictor matrix X and the response matrix Y are regarded as training data, and calculation of matrices A, B, W and U is regarded as training the model. When a new vector x is obtained, the response attributes of the new vector x can be predicted. In detail, the new vector x includes M attributes. In other words, the number of the attributes of the new vector_is equal to the number of the prediction attributes of each prediction record. Note that at least one attribute of the new vector is masked which may be set to be zero. The new vector x is merged with the predictor matrix X (e.g. add into the last column) to obtain a new predictor matrix written as [X|x] with size of M×(N+1). Next, a product $WU^T$ [X|x] of the new predictor matrix, the weight matrix and the projection matrix is calculated. The size of the matrix $WU^T$ [X|x] is L×(N+1). The last column of the matrix $WU^T$ [X|x] includes L response attributes corresponding to the new vector x.

The subspace analysis is described herein. The response matrix Y is approximately equal to the product of the weight matrix W, the projection matrix U and the predictor matrix X that means the dimensionality of the predictor matrix X is reduced. To be specific, the predictor matrix X is projected onto a subspace formed by the matrix U, and the weight matrix W represents the coefficients of each basis of the subspace. By constantly considering the correlation between the independent variables (i.e. predictor matrix X) and the dependent variables (i.e. response matrix Y), discriminative components of the independent variables are extracted to form the projection matrix U, and discriminative imputation is also accomplished.

Figure 2:
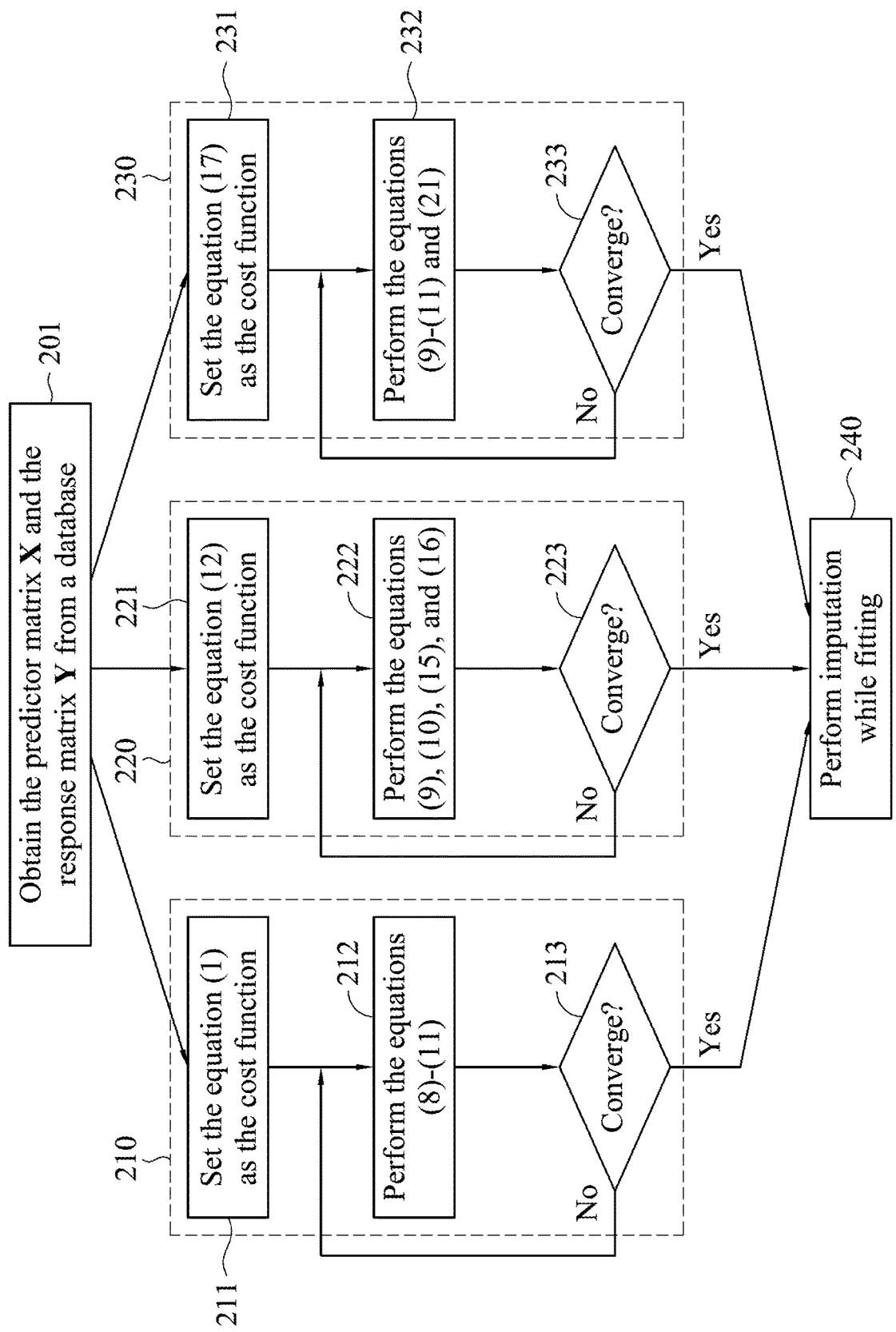
FIG. 2 is a flow chart of a privacy-preserving predicting method in accordance with an embodiment.

FIG. 2 is a flow chart of a privacy-preserving predicting method in accordance with an embodiment. Referring to FIG. 2, in step 201, the predictor matrix X and the response matrix Y are obtained from a database. Procedures 210, 220, and 230 correspond to the first to third embodiments respectively. One of the procedures 210, 220, and 230 is selectively performed.

The procedure 210 includes steps 211-213. In the step 211, the equation (1) is set as the cost function. In the step 212, the equations (8)-(11) are performed to update the matrices A, B, U, and W. The step 213 determines if the update converges. The step 212 is repeated if computation does not converge; otherwise the procedure 210 ends.

The procedure 220 includes step 221-223. The equation (12) is set as the cost function in the step 221. In the step 222, the equations (9), (10), (15), and (16) are performed to update the matrices A, B, U, and W. The step 223 determines if the update converges. The step 222 is repeated if computation does not converge; otherwise the procedure 220 ends.

The procedure 230 includes step 231-233. The equation (17) is set as the cost function in the step 231. In the step 232, the equations (9)-(11) and (21) are performed to update the matrices A, B, U, and W. The step 233 determines if the update converges. The step 232 is repeated if computation does not converge; otherwise the procedure 230 ends.

After the procedure 210, 220, or 230 is performed, in step 240, the imputation and fitting procedure are performed at the same time. Alternatively, the matrices U and W are extracted to perform subspace analysis. However, all the steps in FIG. 2 have been described in detail above, and therefore the description will not be repeated. Note that the steps in FIG. 2 can be implemented as program codes or circuits, and the disclosure is not limited thereto. In addition, the method in FIG. 2 can be performed with the aforementioned embodiments, or can be performed independently. In other words, other steps may be inserted between the steps of the FIG. 2.

Note that the mentioned attributes may refer to independent/dependent variables, predictor/response, or features in some embodiments.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A privacy-preserving predicting method for an electric device, the privacy-preserving predicting method comprising:

obtaining a predictor matrix comprising a plurality of prediction records, wherein each of the prediction records comprises a plurality of prediction attributes, and at least one of the prediction attributes is masked, wherein the prediction records correspond to a plurality of users respectively, and the prediction attributes comprise age, genders, places of residence, web browsing time and purchase histories of the users;

obtaining a response matrix comprising a plurality of response records, wherein each of the response records comprises a plurality of response attributes, wherein the response records correspond to the users respectively, and the response attributes comprise advertising browsing time;

setting that the predictor matrix is approximately equal to a product of a basis matrix and a coefficient matrix, setting that the response matrix is approximately equal to a product of a weight matrix, a projection matrix, and the predictor matrix with all of the basis matrix, the coefficient matrix, the weight matrix and the projection matrix equal to nonnegative matrices, and setting that the projection matrix, the weight matrix or a product of the projection matrix and the predictor matrix is orthogonal so as to determine a cost function;

setting that the projection matrix is orthogonal, and setting a following equation as the cost function:

$$E=\|Y-WU^TAB\|_F^2+\rho_X\|X-AB\|_F^2+\rho_A\|A\|_F^2+\rho_B\|B\|_F^2+\rho_W\|W\|_F^2+\rho_U\|U\|_F^2+Tr\{\alpha(U^TU-I)\},$$

wherein X represents the predictor matrix, Y represents the response matrix, W represents the weight matrix, U represents the projection matrix, A represents the basis matrix, B represents the coefficient matrix, $\alpha$ represents a symmetric Largrangian multiplier matrix, I represents an identity matrix, $\rho_X$, $\rho_A$, $\rho_B$, $\rho_W$ and $\rho_U$ are real numbers, $Tr(\cdot)$ is a trace operator, and $\|\cdot\|_F^2$ is a square of a Frobenius norm;

in a training phase, estimating the basis matrix, the coefficient matrix, the weight matrix and the projection matrix according to the cost function for training a model, wherein the response matrix and the predictor matrix are regarded as training data;

in a test phase, obtaining a new vector comprising a plurality of attributes, wherein a number of the attributes is equal to a number of the prediction attributes of each of the prediction records, and at least one of the attributes of the new vector is masked; and in the test phase, merging the new vector with the predictor matrix to obtain a new predictor matrix, and calculating a product of the new predictor matrix, the weight matrix and the projection matrix to obtain a plurality of values of the response attributes corresponding to the new vector to push advertisements to a new user corresponding to the new vector.

2. The privacy-preserving predicting method of claim 1, further comprising:

estimating a product of the basis matrix and the coefficient matrix to obtain a masked prediction attribute of the prediction attributes.

3. A privacy-preserving predicting method for an electric device, the privacy-preserving predicting method comprising:

obtaining a predictor matrix comprising a plurality of prediction records, wherein each of the prediction records comprises a plurality of prediction attributes, and at least one of the prediction attributes is masked, wherein the prediction records correspond to a plurality of users respectively, and the prediction attributes comprise age, genders, places of residence, web browsing time and purchase histories of the users;

obtaining a response matrix comprising a plurality of response records, wherein each of the response records comprises a plurality of response attributes, wherein the response records correspond to the users respectively, and the response attributes comprise advertising browsing time;

setting that the predictor matrix is approximately equal to a product of a basis matrix and a coefficient matrix, setting that the response matrix is approximately equal to a product of a weight matrix, a projection matrix, and the predictor matrix with all of the basis matrix, the coefficient matrix, the weight matrix and the projection matrix equal to nonnegative matrices, and setting that the projection matrix, the weight matrix or a product of the projection matrix and the predictor matrix is orthogonal so as to determine a cost function;

setting that the weight matrix is orthogonal, and setting a following equation as the cost function:

$$E=\|Y-WU^TAB\|_F^2+\rho_X\|X-AB\|_F^2+\rho_A\|A\|_F^2+\rho_B\|B\|_F^2+\rho_W\|W\|_F^2+\rho_U\|U\|_F^2+Tr\{\beta(W^TW-I)\},$$

wherein X represents the predictor matrix, Y represents the response matrix, W represents the weight matrix, U represents the projection matrix, A represents the basis matrix, B represents the coefficient matrix, $\beta$ represents a symmetric Largrangian multiplier matrix, I represents an identity matrix, $\rho_X$, $\rho_A$, $\rho_B$, $\rho_W$ and $\rho_U$ are real numbers, $Tr(\cdot)$ is a trace operator, and $\|\cdot\|_F^2$ is a square of a Frobenius norm;

in a training phase, estimating the basis matrix, the coefficient matrix, the weight matrix and the projection matrix according to the cost function for training a model, wherein the response matrix and the predictor matrix are regarded as training data;

in a test phase, obtaining a new vector comprising a plurality of attributes, wherein a number of the attributes is equal to a number of the prediction attributes of each of the prediction records, and at least one of the attributes of the new vector is masked; and in the test phase, merging the new vector with the predictor matrix to obtain a new predictor matrix, and calculating a product of the new predictor matrix, the weight matrix and the projection matrix to obtain a plurality of values of the response attributes corresponding to the new vector to push advertisements to a new user corresponding to the new vector.

4. A privacy-preserving predicting method for an electric device, the privacy-preserving predicting method comprising:

obtaining a predictor matrix comprising a plurality of prediction records, wherein each of the prediction records comprises a plurality of prediction attributes, and at least one of the prediction attributes is masked, wherein the prediction records correspond to a plurality of users respectively, and the prediction attributes comprise age, genders, places of residence, web browsing time and purchase histories of the users;

obtaining a response matrix comprising a plurality of response records, wherein each of the response records comprises a plurality of response attributes, wherein the response records correspond to the users respectively, and the response attributes comprise advertising browsing time;

setting that the predictor matrix is approximately equal to a product of a basis matrix and a coefficient matrix, setting that the response matrix is approximately equal to a product of a weight matrix, a projection matrix, and the predictor matrix with all of the basis matrix, the coefficient matrix, the weight matrix and the projection matrix equal to nonnegative matrices, and setting that the projection matrix, the weight matrix or a product of the projection matrix and the predictor matrix is orthogonal so as to determine a cost function;

setting that a product of the projection matrix and the predictor matrix is orthogonal, and setting a following equation as the cost function:

$$E=\|Y-WU^TAB\|_F^2+\rho_X\|X-AB\|_F^2+\rho_A\|A\|_F^2+\rho_B\|B\|_F^2+\rho_W\|W\|_F^2+\rho_U\|U\|_F^2+Tr\{\gamma(U^T\Sigma XXU-1)\},$$

wherein X represents the predictor matrix, Y represents the response matrix, W represents the weight matrix, U represents the projection matrix, A represents the basis matrix, B represents the coefficient matrix, γ represents a symmetric Largrangian multiplier matrix, I represents an identity matrix, $E_{XX}=XX^T$, $\rho_X$, $\rho_A$, $\rho_B$, $\rho_W$ and $\rho_U$ are real numbers, Tr(·) is a trace operator, and $\|\cdot\|_F^2$ is a square of a Frobenius norm;

in a training phase, estimating the basis matrix, the coefficient matrix, the weight matrix and the projection matrix according to the cost function for training a model, wherein the response matrix and the predictor matrix are regarded as training data;

in a test phase, obtaining a new vector comprising a plurality of attributes, wherein a number of the attributes is equal to a number of the prediction attributes of each of the prediction records, and at least one of the attributes of the new vector is masked; and in the test phase, merging the new vector with the predictor matrix to obtain a new predictor matrix, and calculating a product of the new predictor matrix, the weight matrix and the projection matrix to obtain a plurality of values of the response attributes corresponding to the new vector to push advertisements to a new user corresponding to the new vector.

* * * * *